(12) United States Patent
Loutz et al.

(10) Patent No.: US 10,701,860 B2
(45) Date of Patent: Jul. 7, 2020

(54) SCREW CONVEYOR ASSEMBLY FOR A COMBINE HARVESTER

(71) Applicant: DEERE & COMPANY, Moline, IL (US)

(72) Inventors: Eric Loutz, Eriching Guiderkirch (FR); Kai-Martin Kunkler, Zweibrucken (DE); Karl Schewes, Zweibrucken (DE); Bernd Bastian, Zweibrucken (DE); Jakob Albrecht, Zweibrucken (DE)

(73) Assignee: DEERE & COMPANY, Moline, IL (US)

( * ) Notice: Subject to any disclaimer, the term of this patent is extended or adjusted under 35 U.S.C. 154(b) by 191 days.

(21) Appl. No.: 15/915,482

(22) Filed: Mar. 8, 2018

(65) Prior Publication Data

US 2018/0303032 A1   Oct. 25, 2018

(51) Int. Cl.
*A01D 41/12*   (2006.01)
*B65G 33/14*   (2006.01)
(Continued)

(52) U.S. Cl.
CPC ......... *A01D 41/1217* (2013.01); *B65G 33/14* (2013.01); *B65G 33/265* (2013.01);
(Continued)

(58) Field of Classification Search
CPC ............. A01D 41/1217; B65G 65/466; B65G 41/002; B65G 33/32; B65G 33/265;
(Continued)

(56) References Cited

U.S. PATENT DOCUMENTS

| 2,783,907 | A | * | 3/1957 | Hudgins | ............ A01D 41/1217 414/505 |
| 3,241,657 | A | * | 3/1966 | Buschbom | ............ B65G 33/00 198/550.6 |

(Continued)

FOREIGN PATENT DOCUMENTS

| AT | 365401 B | 1/1982 |
| EP | 0274761 A1 | 7/1986 |

(Continued)

OTHER PUBLICATIONS

European Search Report, dated Jul. 16, 2018, 6 pages, European Patent Office.

*Primary Examiner* — Arpad Fabian-Kovacs
(74) *Attorney, Agent, or Firm* — Taft Stettinius & Hollister LLP; Stephen F. Rost

(57) ABSTRACT

A screw conveyor assembly includes a first screw conveyor with a first housing and a first conveyor screw arranged therein, a second screw conveyor with a second housing and a second conveyor screw arranged therein, a transition housing to which the first housing and the second housing are connected forming a transition angle, and a runner disposed in the transition housing and arranged to conduct material being conveyed from the first conveyor screw to the second conveyor screw. The first conveyor screw is arranged upstream of the second conveyor screw. An additional conveyor element is disposed on a helix of the first conveyor screw, such that the helix is directly adjacent to the transition housing.

20 Claims, 3 Drawing Sheets

(51) Int. Cl.
  *B65G 33/26* (2006.01)
  *B65G 33/32* (2006.01)
  *B65G 41/00* (2006.01)
  *B65G 65/46* (2006.01)

(52) U.S. Cl.
  CPC ........... *B65G 33/32* (2013.01); *B65G 41/002* (2013.01); *B65G 65/466* (2013.01); *B65G 2201/042* (2013.01)

(58) Field of Classification Search
  CPC .. B65G 33/14; B65G 2201/042; B65G 65/46; B65G 2812/055; B65G 2814/0326; A01F 12/46; B60P 1/42; B60P 1/40
  See application file for complete search history.

(56) References Cited

U.S. PATENT DOCUMENTS

| | | | | |
|---|---|---|---|---|
| 3,638,812 | A * | 2/1972 | Ryczek | A01D 41/1217 414/523 |
| 3,664,525 | A * | 5/1972 | Herbsthofer | A01D 41/1217 414/326 |
| 3,670,913 | A * | 6/1972 | Reaves | A01D 41/1217 414/505 |
| 3,872,982 | A * | 3/1975 | Rowland-Hill | A01D 41/1217 414/326 |
| 4,037,745 | A | 7/1977 | Hengen et al. | |
| 4,093,087 | A | 6/1978 | DeCoene | |
| 4,714,398 | A * | 12/1987 | Rohwedder | A01D 41/1217 198/313 |
| 5,511,925 | A * | 4/1996 | Muth | B65G 65/466 198/550.6 |
| 6,248,015 | B1 * | 6/2001 | Rayfield | A01D 41/1208 460/131 |
| 6,767,174 | B2 * | 7/2004 | Cresswell | B60P 1/42 198/668 |
| 7,367,881 | B2 * | 5/2008 | Voss | A01D 41/1217 414/526 |
| 8,033,377 | B2 * | 10/2011 | Reimer | B65G 33/32 198/313 |
| 8,696,292 | B2 * | 4/2014 | Dulong | A01F 12/46 414/310 |
| 8,827,782 | B2 * | 9/2014 | Dise | A01F 12/46 460/114 |
| 9,723,783 | B2 * | 8/2017 | Patterson | A01D 41/1217 |
| 9,907,229 | B2 * | 3/2018 | Sorensen | A01D 41/1217 |
| 10,399,787 | B2 * | 9/2019 | Rodrigues | A01F 12/46 |
| 10,426,092 | B2 * | 10/2019 | Van Mill | A01D 90/10 |
| 2012/0261236 | A1 * | 10/2012 | Farrell | B65G 33/32 198/657 |
| 2012/0269607 | A1 * | 10/2012 | Farley | B65G 33/14 414/507 |
| 2015/0237804 | A1 * | 8/2015 | Van Mill | A01D 90/10 414/523 |

FOREIGN PATENT DOCUMENTS

| | | | |
|---|---|---|---|
| EP | 1186222 | A1 | 3/2002 |
| EP | 2245917 | A2 | 1/2016 |
| GB | 1038037 | A | 8/1966 |
| WO | WO-0075053 | A1 * | 12/2000 ............ B65G 33/14 |

* cited by examiner

SCREW CONVEYOR ASSEMBLY FOR A COMBINE HARVESTER

RELATED APPLICATIONS

This application claims priority to German Patent Application Ser. No. 102017003738.8, filed Apr. 19, 2017, the disclosure of which is hereby incorporated by reference in its entirety.

FIELD OF THE DISCLOSURE

The present disclosure relates to a screw conveyor assembly, and in particular, to a screw conveyor assembly for a combine harvester.

BACKGROUND

Agricultural combine harvesters are used in the harvesting of grains in order to harvest and to thresh plants cultivated in a field. The threshed crop is subsequently also processed by a separating device. The grain obtained in the threshing and separating process is cleaned in a cleaning device and deposited in a grain tank, from which it is finally transferred to a transport vehicle.

In order to unload the grain tank, use is customarily made of a screw conveyor which is pivotable about the vertical axis between a pivoted-out unloading position, in which it extends transversely with respect to the forward direction, and a transport position which is pivoted rearward. In order to keep the output end of the screw conveyor as high as possible over the base at a given height of the grain tank base (and therefore also to be able to move transport vehicles of relatively high construction under the output end of the screw conveyor), customary screw conveyors (see, e.g., EP 1 186 222 A1) include a first portion which extends approximately vertically upward and to which a second, horizontal portion is connected. The two portions are connected to each other by a transition housing which is angled by approximately 90° and in which the conveyor screws of the two portions are coupled to each other in terms of drive by drive elements (propeller shafts).

A certain spatial distance that is not passed over by actively driven conveyor elements arises in the transition housing between the first conveyor screw and the second conveyor screw. Furthermore, the flow of crop is deflected and, in addition, in many embodiments, the cross section is tapered from the first toward the second screw conveyor. In the event of certain crop conditions (e.g., in the event of relatively moist grain or small grain dimensions which cause a low ratio between volume and therefore mass and surface such as in the case of grass seeds, and which therefore cannot be readily thrown through the transition housing), these circumstances may lead to transfer problems and to clogging.

Conventional solutions to this problem (e.g., AT 365 401 B, GB 1 038 037 A and U.S. Pat. No. 4,093,087 A) provide conveyor elements in the form of blades, paddles, or the like which are fitted to a connecting shaft between the two conveyor screws. However, they do not lead in all cases to a satisfactory conveying behavior and prevent the connecting shaft together with its joints from being able to be covered. Accordingly, the conveyed grain also comes into contact with the lubricant of the joints and can be mechanically damaged by elements of the joints moving relative to one another.

Thus, there is a need for a combine harvester equipped with a screw conveyor that overcomes many of the problems in the art.

SUMMARY

In a first embodiment of the present disclosure, a screw conveyor assembly for transporting material being conveyed in the form of granular material (such as, for example, grain) includes a first screw conveyor with a first housing and a first conveyor screw arranged therein, a second screw conveyor with a second housing and a second conveyor screw arranged therein, and a transition housing to which the first housing and the second housing are connected forming a transition angle. The first conveyor screw is arranged upstream of the second conveyor screw, i.e., is drivable in such a manner that it conveys its material being conveyed into the transition housing, from which the material is taken over by the second conveyor screw. It is proposed to fit a runner in the transition housing. The runner is arranged to conduct the material being conveyed from the first conveyor screw to the second conveyor screw, or to fasten an additional conveyor element to the helix of the first conveyor screw, the helix being directly adjacent to the transition housing.

Accordingly, the runner is arranged as a passive element in the transition housing and conducts the material being conveyed from the first conveyor screw to the second conveyor screw. In addition, the conveyor element improves the output behavior of the first screw conveyor.

According to one embodiment, a drive connection (customarily including a propeller shaft) for coupling the first and second conveyor screw in terms of drive is provided in the transition housing, which drive connection can be shielded in relation to the interior of the transition housing by a covering.

The runner can include a front edge with respect to the direction of flow of the material being conveyed, the front edge extending at least approximately radially with respect to the axis of rotation of the first conveyor screw or at least approximately parallel to the axis of rotation of the second conveyor screw, in a plane running orthogonally to the axis of rotation of the first conveyor screw. The runner can extend helically from the leading edge, with a pitch opposed to the first conveyor screw, to a rear edge. The pitch of the runner can be greater than the pitch of the first conveyor screw. The rear edge of the runner can extend at least approximately orthogonally to the adjacent inner wall of the concavely curved transition housing. The runner can extend between the inner wall of the transition housing and the covering, or it can be fitted to that side of the transition housing that faces away from the second screw conveyor.

The additional conveyor element can be formed by a ramp-like helical portion, the pitch of which is greater than the pitch of the first conveyor screw.

The screw conveyor assembly according to the present disclosure can serve for emptying the grain tank on a combine harvester. It is also conceivable to use the screw conveyor assembly for filling the grain tank or on any other machine in which grain or other granular material is conveyed, such as for emptying a discharge tanker or on any desired other conveyor for granular material, in particular in the form of whole or comminuted grain, as used, for example, in mobile or stationary grain processing plants (e.g., corn mills or corn comminuters or cleaning plants for corn).

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
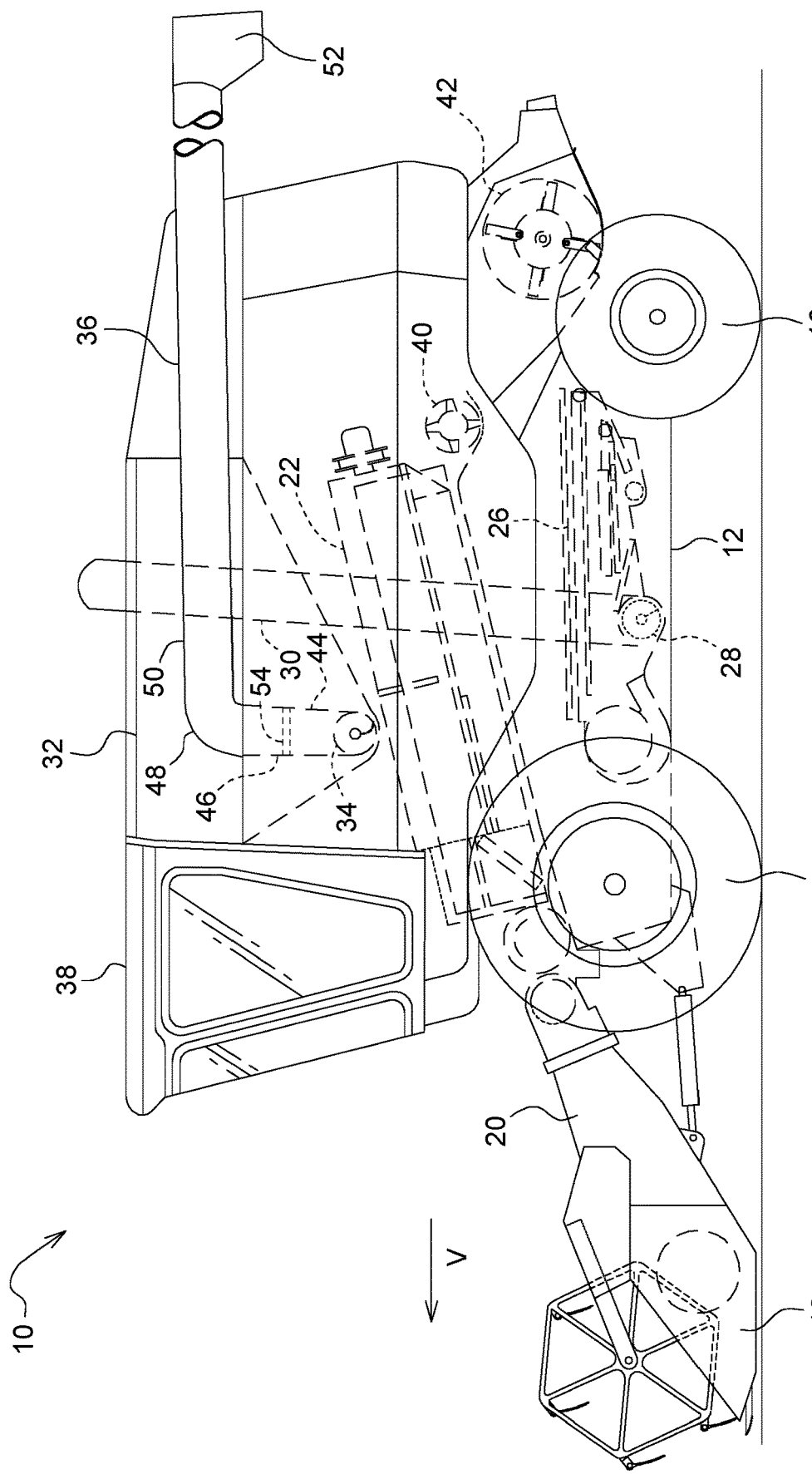
FIG. 1 shows a schematic lateral view of a combine harvester.

FIG. 1 shows a self-propelling harvesting machine in the form of a combine harvester 10, with a chassis 12 which is supported on the ground by means of driven front wheels 14 and steerable rear wheels 16 and is propelled by the wheels. The wheels 14, 16 are set in rotation by means of a drive means (not shown) in order to move the combine harvester 10, for example, over a field which is to be harvested. In the following text, direction information, such as front and rear, relates to the direction of travel V of the combine harvester 10 during a harvesting operation, i.e., the direction running toward the left in FIG. 1.

A harvesting header 18 in the form of a cutting unit is connected in a removable manner to the front end region of the combine harvester 10 in order, during a harvesting operation, to harvest crop in the form of corn or other threshable cereals from the field and to feed them upward and rearward through an oblique conveyor assembly 20 to an axial threshing unit 22. The mixture containing grain and impurities that passes through threshing concaves and grates in the axial threshing unit 22 passes into a cleaning device 26. Corn cleaned by the cleaning device 26 is fed by means of a grain screw 28 to a grain elevator 30 that conveys the corn into a grain tank 32. The cleaned corn from the grain tank 32 can be unloaded through an unloading system with a transverse screw 34 and an unloading conveyor designed in the form of a screw conveyor assembly 36. The crop residues output by the axial threshing unit 22 are fed by means of a conveyor drum 40 to a straw chopper 42 that comminutes said crop residues and distributes them over the width of the cutting unit 18 over the field. The systems mentioned are driven by means of an internal combustion engine and are monitored and controlled by an operator from a driver's cab 38. The axial threshing unit 22 which is illustrated and has one or more axial threshing and separating rotors is merely one embodiment and could be replaced, for example, by a tangential threshing unit of one or more threshing drums and subsequent straw rockers or (a) separator rotor(s).

The screw conveyor assembly 36 includes a lower part 44 which extends upwardly from the transverse conveyor screw 34 and is supported rigidly on the chassis 12. At a rotary mounting 54, the upper part of the screw conveyor assembly 36 is supported on the lower part 44 to be rotatable about the vertical axis. The upper part of the screw conveyor assembly 36 can be pivoted about the vertical axis in relation to the rotary mounting 54 by an actuator (not shown) in order to pivot the screw conveyor assembly 36 from the transport position shown in FIG. 1 into an operating position in which it extends outward from the chassis 12 transversely with respect to the direction of travel in order to permit grain to be transferred from the grain tank 32 to a transport vehicle.

The upper part of the screw conveyor assembly 36 comprises a first screw conveyor 46 extending at least approximately vertically upward, a transition housing 48 and a second screw conveyor 50 that extends at least approximately horizontally and extends as far as an outer output end 52 of the screw conveyor assembly 36.

Figure 2:
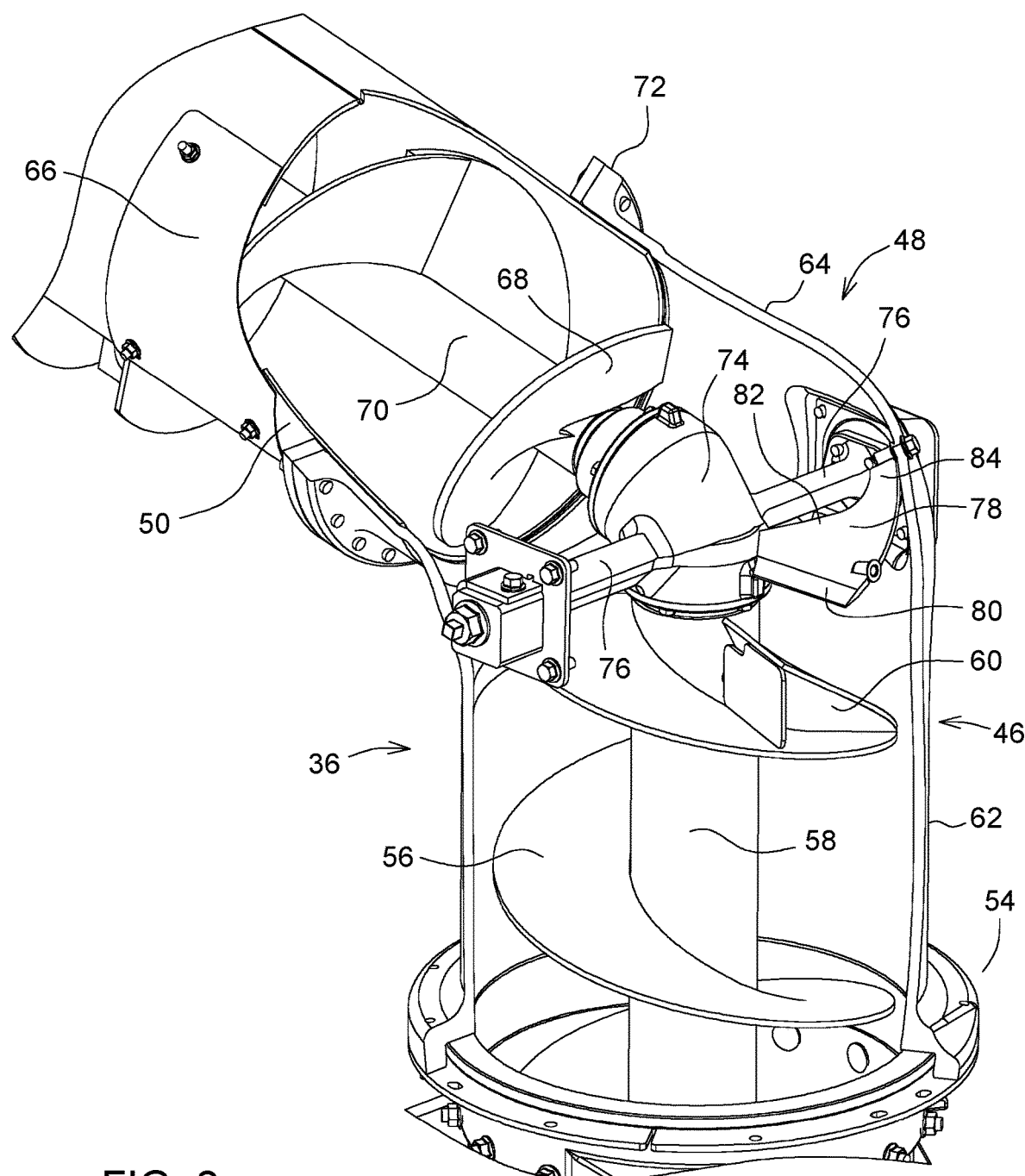
FIG. 2 shows a perspective lateral view of a screw conveyor assembly provided as a grain tank unloading conveyor.
Figure 3:
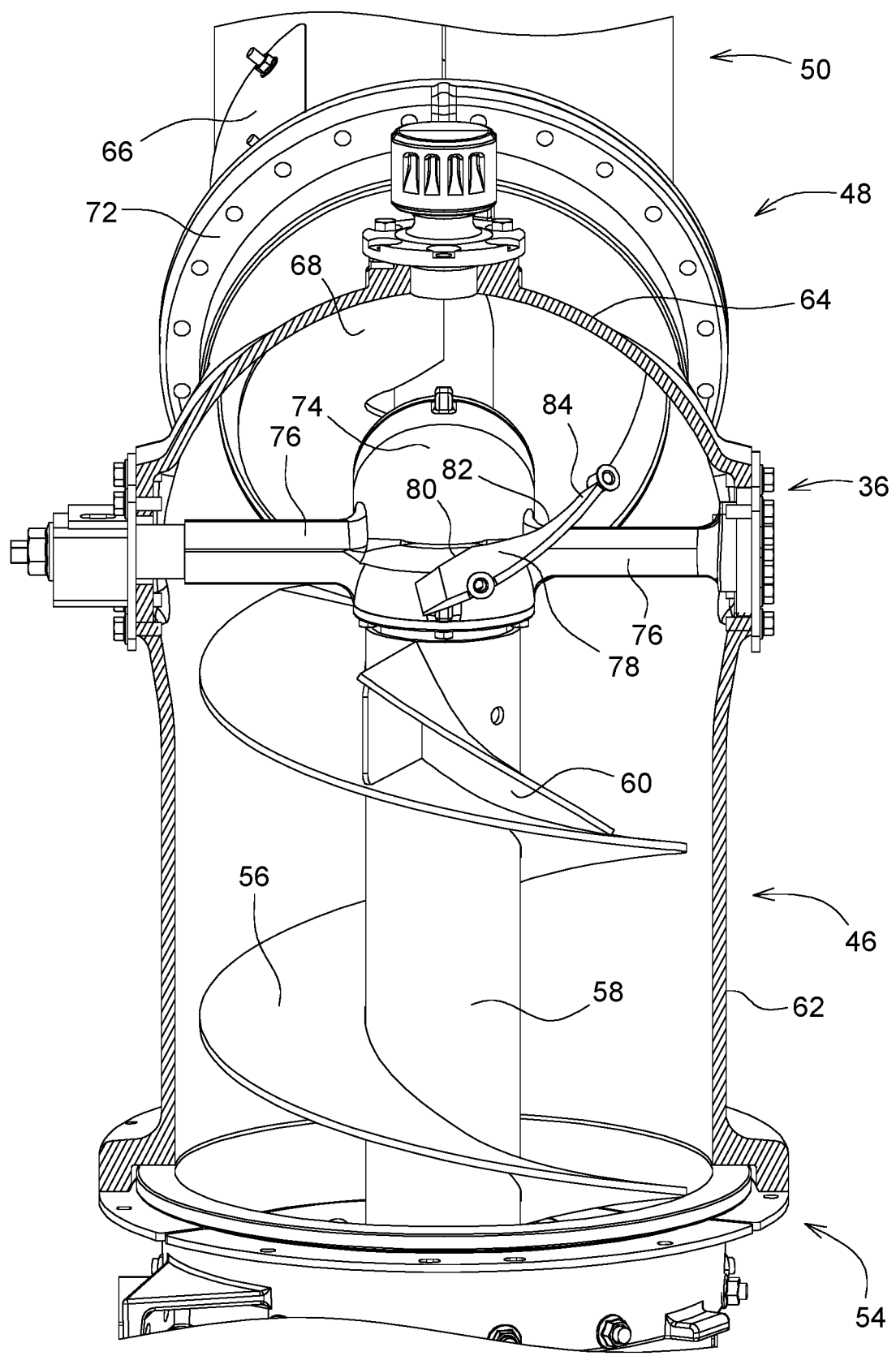
FIG. 3 shows a perspective front view of the screw conveyor assembly.

FIG. 2 shows the first screw conveyor 46, the transition housing 48 and the proximal part (adjacent to the combine harvester 10) of the second screw conveyor 50 obliquely from the front. FIG. 3 shows same from the front.

The first screw conveyor 46 includes a hollow cylindrical (first) housing 62 that is fastened to the rotary mounting 54. A first helical conveyor screw 56 is placed about a central shaft 58 in the first housing 62. The shaft 58 can be hollow or solid and is driven from below, i.e., by a central shaft of a conveyor screw (not shown in FIG. 1) which is arranged in the lower part 44 of the screw conveyor assembly 36 and can be integral with the first conveyor screw 56 or coupled thereto. The shaft of the conveyor screw arranged in the lower part 44 of the screw conveyor assembly 36 can be driven for its part by the transverse conveyor screw 34 or by a separate drive which can be switched on and off depending on requirements.

In order to improve the output behavior of the first conveyor screw 56, an additional conveyor element 60 is fitted to the helix adjacent to the transition housing 48, i.e., shortly before the upper end of the first conveyor screw 56. The additional conveyor element 60 is designed in the manner of a ramp and is formed by a helical portion, the pitch of which is greater than the pitch of the first conveyor screw 56.

The transition housing 48 is formed by a wall 64 curved in an arcuate manner. As shown in FIGS. 2 and 3, the wall 64 can be formed integrally with the first housing 62, e.g., as a cast or welded or pressed part, or separately therefrom, and can be coupled thereto by a welding connection or flange connection. The diameter of the second screw conveyor 50 can be smaller than that of the first screw conveyor 46.

The second screw conveyor 50 comprises a hollow cylindrical (second) housing 66 which is connected to the wall 64 of the transition housing 48 via a flange connection 72. It would also be conceivable to form the second housing 66 integrally with the transition housing 48. A second helical conveyor screw 68 is placed about a central shaft 70 in the second housing 66. The shaft 70 can be hollow or solid and driven from below the shaft 58 via a drive connection which is arranged in the transition housing 48 and is shielded in relation to the interior of the transition housing 48 (and therefore cannot be seen in FIGS. 2 and 3) by a covering 74. The drive connection can comprise a propeller shaft in a manner known per se. The covering 74 is secured to opposite regions of the wall 64 of the transition housing 48 by bolts 76 which extend radially with respect to the first shaft 58 and with respect to the second shaft 70. Instead of the described drive of the shaft 58 by the conveyor screw arranged in the lower part 44 of the screw conveyor assembly 36, it would be conceivable to drive the shaft 58 or the shaft 70 by another drive.

In order to improve the transition, which is sometimes problematic in particular in the case of moist or fine-grained material being conveyed, from the first screw conveyor 46 to the second screw conveyor 50 through the transition housing 48, which is equipped with conveyor elements which are not actively driven, as an alternative or in addition to the additional conveyor element 60, a runner 78 is provided which is arranged in the transition housing 48 adjacent to the first screw conveyor 46 and at a distance from the second screw conveyor 50.

The runner 78 has a leading edge 80 which is arranged radially with respect to the axis of rotation of the shaft 58 and approximately parallel to the axis of rotation of the shaft 70, in the plane lying orthogonally to the axis of rotation of the shaft 58. The position and orientation of the leading edge 80 could differ from the position shown and, for example, could be inclined inward or outward as viewed in the circumferential direction, or inclined upward or downward from the horizontal plane. The runner 78 extends from the wall 64 as far as the covering 74. From the leading edge 80, the runner 78 extends helically to a trailing edge 82 which runs approximately rectilinearly and orthogonally to the adjacent wall 64.

The position and orientation of the trailing edge 82 could differ from the position shown and, for example, as viewed in the vertical direction, could be inclined inward or outward to a greater or lesser extent than illustrated in the drawing or could be inclined upward or downward to a greater or lesser extent in the horizontal direction. Adjacent to the wall 64, the radially outer end of the edge 82 is also adjoined by an (optional) trailing lug 84 which, alternatively or additionally, could also be fitted radially on the inside. The runner 78 forms a relatively short helix which is directed counter to the conveyor screws 56 and 68 and has a greater pitch than the conveyor screws 56, 68. The runner 78 is also slightly bent at the front edge 80, and therefore it has a smaller pitch in a leading region than in the remaining part.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A screw conveyor assembly, comprising:
   a first screw conveyor with a first housing and a first conveyor screw arranged therein;
   a second screw conveyor with a second housing and a second conveyor screw arranged therein;
   a transition housing to which the first housing and the second housing are connected forming a transition angle; and
   a runner disposed in the transition housing and arranged to conduct material being conveyed from the first conveyor screw to the second conveyor screw;
   wherein, the first conveyor screw is arranged upstream of the second conveyor screw;
   wherein, an additional conveyor element is disposed on a helix of the first conveyor screw, the helix being directly adjacent to the transition housing.

2. The screw conveyor assembly of claim 1, further comprising:
   a drive connection arranged in the transition housing for coupling the first and second conveyor screws; and
   a covering configured to shield the drive connection in relation to an interior of the transition housing.

3. The screw conveyor assembly of claim 1, wherein the runner comprises a front edge with respect to a direction of flow of the material being conveyed, the front edge extending at least approximately radially with respect to the first conveyor screw or at least approximately parallel to an axis of rotation of the second conveyor screw, and in a plane running orthogonally to an axis of rotation of the first conveyor screw.

4. The screw conveyor assembly of claim 1, wherein the runner extends helically from a leading edge, with a pitch opposed to the first conveyor screw, to a rear edge.

5. The screw conveyor assembly of claim 4, wherein the pitch of the runner is greater than the pitch of the first conveyor screw.

6. The screw conveyor assembly of claim 3, wherein the rear edge of the runner extends at least approximately orthogonally to an adjacent inner wall of the concavely curved transition housing.

7. The screw conveyor assembly of claim 2, wherein the runner extends between a wall of the transition housing and the covering.

8. The screw conveyor assembly of claim 1, wherein the runner is fitted on the side of the transition housing which faces away from the second screw conveyor.

9. The screw conveyor assembly of claim 1, wherein the additional conveyor element is formed by a helical portion.

10. The screw conveyor assembly of claim 9, wherein a pitch of the helical portion of the additional conveyor element is greater than a pitch of the first conveyor screw.

11. A combine harvester, comprising:
    a grain tank; and
    a screw conveyor assembly arranged for emptying the grain tank, the screw conveyor assembly comprising:
    a first screw conveyor with a first housing and a first conveyor screw arranged therein;
    a second screw conveyor with a second housing and a second conveyor screw arranged therein;
    a transition housing to which the first housing and the second housing are connected forming a transition angle; and
    a runner disposed in the transition housing and arranged to conduct material being conveyed from the first conveyor screw to the second conveyor screw;
    wherein, the first conveyor screw is arranged upstream of the second conveyor screw;
    wherein, an additional conveyor element is disposed on a helix of the first conveyor screw, the helix being directly adjacent to the transition housing.

12. The combine harvester of claim 11, further comprising:
    a drive connection arranged in the transition housing for coupling the first and second conveyor screws; and
    a covering configured to shield the drive connection in relation to an interior of the transition housing.

13. The combine harvester of claim 11, wherein the runner comprises a front edge with respect to a direction of flow of the material being conveyed, the front edge extending at least approximately radially with respect to the first conveyor screw or at least approximately parallel to an axis of rotation of the second conveyor screw, and in a plane running orthogonally to an axis of rotation of the first conveyor screw.

14. The combine harvester of claim 11, wherein the runner extends helically from a leading edge, with a pitch opposed to the first conveyor screw, to a rear edge.

15. The combine harvester of claim 14, wherein the pitch of the runner is greater than the pitch of the first conveyor screw.

16. The combine harvester of claim 13, wherein the rear edge of the runner extends at least approximately orthogonally to an adjacent inner wall of the concavely curved transition housing.

17. The combine harvester of claim 12, wherein the runner extends between a wall of the transition housing and the covering.

18. The combine harvester of claim 11, wherein the runner is fitted on the side of the transition housing which faces away from the second screw conveyor.

19. The combine harvester of claim 11, wherein the additional conveyor element is formed by a helical portion.

20. The combine harvester of claim 19, wherein a pitch of the helical portion of the additional conveyor element is greater than a pitch of the first conveyor screw.

* * * * *